Charles L. Kingsley's Improvement in BENCH VISE
Assignor to C. Parker.
PATENTED
NOV 26 1867
71498
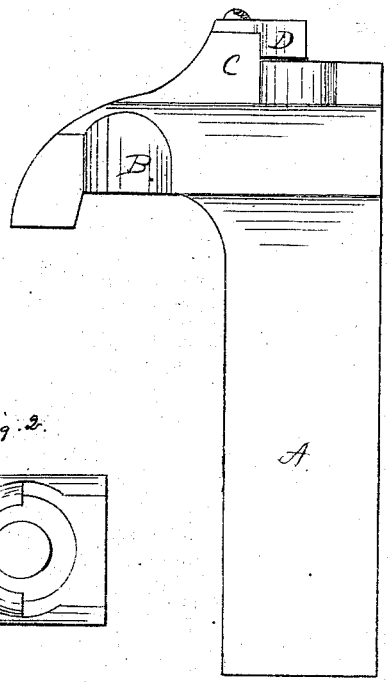
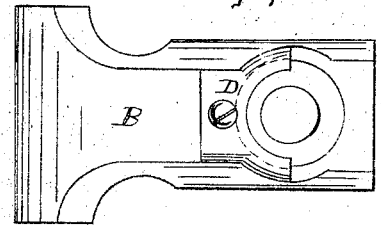
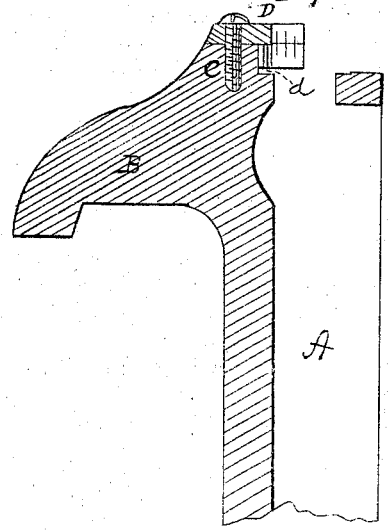
Witnesses
A. J. Tibbits
John W. Shumway
Charles L. Kingsley
Inventor
By his Attorney
John E. Earle

United States Patent Office.

CHARLES L. KINGSLEY, OF MERIDEN, CONNECTICUT, ASSIGNOR TO CHARLES PARKER, OF THE SAME PLACE.

*Letters Patent No. 71,498, dated November 26, 1867.*

---

IMPROVEMENT IN BENCH-VISES.

---

*The Schedule referred to in these Letters Patent and making part of the same.*

---

TO ALL WHOM IT MAY CONCERN:

Be it known that I, CHARLES L. KINGSLEY, of Meriden, in the county of New Haven, and State of Connecticut, have invented an Improvement in Bench-Vises; and I do hereby declare the following, when taken in connection with the accompanying drawings, and the letters of reference marked thereon, to be a full, clear, and exact description of the same, and which said drawings constitute part of this specification, and represent, in—

Figure 1, a side view.

Figure 2, an end view; and in

Figure 3, a longitudinal section.

This invention relates to an improvement in what is known as the "Parker vise," which is a vise having the movable jaw attached to a horizontal slide, but is alike applicable to other parallel vises or such other vises as withdraw the movable jaw by means of the screw, and consists in the peculiar device for causing the return of the screw to withdraw the jaw. Heretofore various devices have been resorted to for this purpose, but in all cases there is no arrangement for compensating or taking up the wear occasioned by the continual turning of the screw, so that the screw must be turned to a greater or less extent before it has any effect upon the jaw. By my invention this difficulty is overcome.

To enable others to construct my improvement, I will proceed to describe the same as illustrated in the accompanying drawings.

A is the hollow shank through which the screw passes; B, the jaw fixed to or made a part of the bar A, in the usual manner. The jaw is formed with a projection, C, in front, and to this projection C is fixed a plate, D, by means of a screw, as denoted in the drawings. The said plate D has a channel, as seen in fig. 3, formed in its under or inside, corresponding to the collar on the screw, so that when placed over the screw, the collar working in the said channel moves the jaw out and in in the usual manner. Between the said plate and the bar A, a space, $d$, is left, (see fig. 3,) so that when the channel or collar on the screw shall have become so worn as to make the collar loose in the channel, then remove the plate from the projection C and cut away from the face of the projection or from the plate sufficient to tighten the plate, and replace the plate, and the screw again works in a perfect manner, or, if preferred, in the construction of the vise, thin plates may be placed between the plate D and the face of the projection C, so that one or more of the plates may be removed to compensate for the wear of the collar.

I do not broadly claim forming a channel at the front end of the bar to cause the screw to move the jaw; but what I do claim as new and useful, and desire to secure by Letters Patent, is—

The plate D, constructed with the channels, as described, and arranged upon the projection C on the jaw B, so as to be adjusted thereon in the manner specified.

CHAS. L. KINGSLEY.

Witnesses:
JOHN W. MILES,
ALMESON MILES.